Patented Dec. 8, 1931                                                            1,835,700

UNITED STATES PATENT OFFICE

WILLIAM J. EDMONDS AND IGNACE J. KRCHMA, OF TERRE HAUTE, INDIANA, ASSIGNORS TO COMMERCIAL SOLVENTS CORPORATION, OF TERRE HAUTE, INDIANA, A CORPORATION OF MARYLAND

METHOD OF SEPARATING AND RECOVERING ACETIC AND BUTYRIC ACIDS

No Drawing.        Application filed June 21, 1928.  Serial No. 287,344.

The present invention relates to a method of separating and recovering the acetic and butyric acids from mixtures thereof, and more especially from aqueous solutions of such mixtures.

More especially, the method relates to the separation and recovery of the acetic and butyric acids resulting from the fermentation of cellulose, as set forth in the United States Patents 1,443,881, January 30, 1923, and 1,639,571, September 16, 1927. The product resulting from the cellulose fermentation of the process of the said patents contains, among other things, acetic and butyric acids in the form of their sodium or equivalent salts in aqueous solution. Difficulty has been experienced in the recovery of these acids owing to the fact that when in aqueous solution, butyric acid forms with water, a constant boiling mixture and the affinity of acetic acid for water is sufficiently great to prevent the separation of this acid from the water by simple distillation; so that an aqueous solution containing a mixture of acetic and butyric acids, when distilled, will in general yield a distillate of approximately the same composition as the mixture being distilled. However, a substantially anhydrous mixture of the two acids may be separated into its components by simple fractional distillation. The present invention is predicated upon this fact and the process is marked by simplicity and efficiency.

In the application of the present procedure, it may be noted that during the course of the cellulose fermentation of the above mentioned patents, the acid solution is neutralized with an alkaline material, such as sodium carbonate, bicarbonate, or equivalent salts thus converting the acids present into their sodium or equivalent salts, such as, for example, sodium acetate, sodium butyrate, etc.

In accordance with the present process, the aqueous solution resulting from the neutralization is evaporated to dryness, and the salt residue resulting from this evaporation is dehydrated by vacuum drying or fusion. The residue which is essentially sodium (or equivalent) acetate and butyrate is treated with concentrated sulphuric acid in quantities sufficient to release the volatile organic acids, and the acid mixture is distilled. The condensate, consisting essentially of a mixture of acetic and butyric acids with any water introduced with the sulphuric acid, is carefully fractionated. From the fraction collected up to about 112° C. and containing practically all the water, a little butyric acid and considerable acetic acid, the acids may be separated by any standard method, such as esterification with butyl alcohol. Or, this fraction can be neutralized with sodium carbonate, or the like, and the resulting salt solution returned to the process for redehydration. In this manner there would eventually be obtained glacial acetic acid and anhydrous butyric acid.

The residue from the above distillation coming over above 112° C. contains the bulk of the acids and, being anhydrous, can be directly separated by distillation into its components. If desired, the acetic acid resulting from this fraction may be added to that passing over with the first runs of the distillate.

Again, the said fraction collected up to about 112° C. may be dehydrated by distillation with benzol or ethyl acetate, or petroleum fractions boiling from approximately 70° C. to approximately 90° C., or with any water immiscible liquid having this range of boiling points, the minimum constant boiling mixture carrying off all the water while leaving the acetic and butyric acids in anhydrous form, which may then be substantially separated into its components by distillation.

The following specific illustration serves to illustrate the process:

A quantity of the fermentation products of cellulose was taken, evaporated to dryness, and the residue fused at about 230° C. Of this residue, there were taken 785 gms., analyzing 600 gms. of acetic acid, 105 gms. of butyric acid, and 80 gms. of water, which were treated with 750 c. c. of concentrated sulphuric acid and the volatile acid distilled off under a vacuum of 20-25 inches of mercury. The resulting distillate was fractionally distilled as follows:

Fraction #1. Up to 113° 30% solution of HAc (24 gms.), 2.1 gms. HBu, 80 gms. H₂O.

Fraction #2. 114°–125° 99–99.5% acetic acid 367 gms., traces of butyric acid.

Faction #3. 126°–150° 50% HAc–50% HBu, 45.4 gms.

Fraction #4. 150°–175° 99%–99.5% HBu 70.4 gms., no acetic acid.

It will thus be seen that the first fraction consists of a dehydrating step, by which the removal of water is accomplished. Because of the affinity of acetic acid for water, some of this acid will pass over as long as water is present in the mixture. The solution thus obtained is about a 30% solution of acetic acid, the solution containing also butyric acid in about one-sixth of the amount of the water present. To this solution is added, if desired, the acetic acid of glacial strength obtained in the next fraction, there resulting a solution of acetic acid of about 90% concentration. This is then esterified as with butyl alcohol to produce butyl acetate to be used as a lacquer solvent, the butyric acid content of the said solution, which is about 2%, being converted into butyl butyrate, which is also an efficient lacquer solvent, and which therefore adds its effect to that of the butyl acetate, while not being present in offensive amounts.

This fraction may also be neutralized with sodium carbonate, or the like, and the resulting salt solution returned to the process for redehydration; or the fraction may be dehydrated by distillation with benzol, ethyl acetate, etc., all as previously set forth.

The third fraction consists of anhydrous acetic and butyric acids in about equal amounts. Refractionation of this mixture will separate its components, as the acids are present in anhydrous form.

The fourth fraction is substantially pure butyric acid.

It will thus be seen that the method herein set forth is a simple method for the separation of the acetic and butyric acids produced through the so-called Langwell process of fermenting cellulose described in the above mentioned patents. The method is applicable to the separation of any volatile acids, as for example, the separation of acetic acid and formic acid, formic acid and propionic acid, etc.

The purpose of the addition of the sulphuric acid is to liberate the volatile acids from their fused (dehydrated) salts. Even though fused, there will remain in the fused material a certain small amount of water which will pass over in the sulphuric acid distillation. This distillation is carried out under reduced pressure, the vacuum being maintained at a practical degree, say 20 to 25 inches, the reduced pressure preventing the charring of the volatile acids through the action of the sulphuric acid. It is the residual water which produces the 30% acetic acid solution which the first fractionation of the mixed acids produces; and all of the water is removed by this fraction, so that the separation of the acetic and butyric acids can be accomplished as there is no such affinity between them as exists between acetic acid and water, or between butyric acid and water, so that the two acids when in anhydrous state may be separated by simple fractional distillation, and each acid may thus be recovered substantially free from the other. Instead of sulphuric acid, phosphoric acid may be employed; this possesses the advantage of producing sodium phosphate upon liberation of the volatile acids. From this sodium phosphate both the caustic used in the neutralization step and the phosphoric acid may be recovered for reuse.

It will be understood that it is desired to comprehend within this invention such modifications and changes as may adapt it to varying conditions and uses.

What is claimed is:

1. The process of separating and recovering acetic and butyric acids from a mixed aqueous solution thereof, which comprises converting the said acids into salts which can be dehydrated without decomposition, evaporating the resulting salt solution to dryness and dehydrating the residue thereof, liberating the acids from the dehydrated salts by the addition of concentrated sulphuric acid, distilling the resulting mixture to produce a substantially anhydrous mixture of acetic and butyric acids, fractionating the said substantially anhydrous mixture thereby completely dehydrating the said acetic and butyric acids and also producing an aqueous fraction containing relatively small but substantial amounts of acid values, dehydrating the said aqueous fraction, and recovering in pure form the acetic and butyric acids from the anhydrous mixtures.

2. The process of separating and recovering acetic and butyric acids from mixed aqueous solutions thereof, which comprises converting the said acids into salts which can be dehydrated without decomposition, dehydrating the said salts, liberating the acids therefrom and producing a substantially anhydrous mixture thereof, distilling the said mixture thereby producing anhydrous acetic and butyric acids and an aqueous portion containing relatively small but substantial quantities of the said acids, distilling the said aqueous portion with a water immiscible liquid boiling between 70° C. and 90° C. which does not react with the said acids and which forms a constant boiling point mixture with water but not with the said butyric acid, to dehydrate the acetic and butyric acids contained therein, and recovering in pure form the acetic and butyric acids from the anhydrous portions.

3. In the process of separating and recovering acetic and butyric acids from a mixed aqueous solution thereof containing approximately 30% or less of water, the step which comprises distilling said mixture with a water immiscible liquid boiling between 70° C. and 90° C. which does not react with the said acids and which forms a constant boiling point mixture with water but not with the said butyric acid, to remove the water from said mixture.

4. In the process of separating and recovering acetic and butyric acids from a mixed aqueous solution thereof containing approximately 30% or less of water, the step which comprises distilling said mixture with benzol to dehydrate the acetic and butyric acids contained therein.

5. In the process of separating and recovering acetic and butyric acids from a mixed aqueous solution thereof containing approximately 30% or less of water, the step which comprises distilling said mixture with ethyl acetate to dehydrate the acetic and butyric acids contained therein.

6. In the process of separating and recovering acetic and butyric acids from a mixed aqueous solution thereof containing approximately 30% or less of water, the step which comprises distilling said mixture with a petroleum fraction boiling between 70° C. and 90° C. to dehydrate the acetic and butyric acids contained therein.

7. The process of separating and recovering acetic and butyric acids from mixed aqueous solutions thereof, which comprises converting the said acids into salts which can be dehydrated without decomposition, dehydrating the said salts, liberating the acetic and butyric acids therefrom and producing a substantially anhydrous mixture thereof, distilling the said mixture thereby producing anhydrous acetic and butyric acids, and an aqueous portion containing relatively small but substantial quantities of the said acids, distilling the said aqueous portion with ethyl acetate to dehydrate the acetic and butyric acids contained therein, and recovering in pure form by distillation, the acetic and butyric acids from the anhydrous portions.

8. The process of separating and recovering acetic and butyric acids from mixed aqueous solutions thereof, which comprises converting the said acids into salts which can be dehydrated without decomposition, dehydrating the said salts, liberating the acids therefrom and producing a substantially anhydrous mixture thereof, distilling the said mixture thereby producing anhydrous acids and an aqueous portion containing relatively small but substantial quantities of the said acids, distilling the said aqueous portion with benzol to dehydrate the acetic and butyric acids contained therein, and recovering in pure form by distillation, the acetic and butyric acids from the anhydrous portions.

9. The process of separating and recovering acetic and butyric acids from mixed aqueous solutions thereof, which comprises converting the said acids into salts which can be dehydrated without decomposition, dehydrating the said salts, liberating the acetic and butyric acids therefrom and producing a substantially anhydrous mixture thereof, distilling the said mixture thereby producing anhydrous acetic and butyric acids, and an aqueous portion containing relatively small but substantial quantities of the said acids, distilling the said aqueous portion with petroleum fractions boiling from about 70° C. to about 90° C. to dehydrate the acetic and butyric acids contained therein, and recovering in pure form by distillation the acetic and butyric acids from the anhydrous portions.

In testimony whereof we affix our signatures.

WILLIAM J. EDMONDS.
IGNACE J. KRCHMA.